United States Patent
Basaralu

(10) Patent No.: US 8,359,071 B2
(45) Date of Patent: *Jan. 22, 2013

(54) POWER MANAGEMENT TECHNIQUES FOR A UNIVERSAL SERIAL BUS

(75) Inventor: Prasanna Basaralu, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1081 days.

This patent is subject to a terminal disclaimer.

(21) Appl. No.: 11/932,603

(22) Filed: Oct. 31, 2007

(65) Prior Publication Data

US 2009/0111524 A1 Apr. 30, 2009

(51) Int. Cl.
*H04B 1/38* (2006.01)
(52) U.S. Cl. ............... 455/559; 455/557; 455/550.1; 370/276

(58) Field of Classification Search ............... 455/13.4, 455/127.5, 418–420, 557, 571–574; 370/267
See application file for complete search history.

(56) References Cited

U.S. PATENT DOCUMENTS

| 6,943,667 | B1 * | 9/2005 | Kammer et al. | 340/286.01 |
| 2006/0085655 | A1 * | 4/2006 | Sung et al. | 713/300 |
| 2007/0140199 | A1 * | 6/2007 | Zhao et al. | 370/338 |

* cited by examiner

*Primary Examiner* — Chuong A Ngo

(57) ABSTRACT

Power management techniques for a universal serial bus are described. For example, a mobile computing device may include an interface having a universal serial bus, a host processor to couple to the interface, and a radio module to couple to the interface. The radio module may have a radio processor and a detector, the detector operative to detect temporary block flow from radio signals communicated over wireless shared media, the radio processor to enable the universal serial bus when the detector detects the temporary block flow and disable the universal serial bus when the detector does not detect the temporary block flow for a guard interval. Other embodiments are described and claimed.

25 Claims, 4 Drawing Sheets

300

DETECT TEMPORARY BLOCK FLOW FROM RADIO SIGNALS COMMUNICATED OVER WIRELESS SHARED MEDIA
302

ENABLE A UNIVERSAL SERIAL BUS BETWEEN A HOST PROCESSOR AND A RADIO PROCESSOR WHEN THE TEMPORARY BLOCK FLOW IS DETECTED
304

DISABLE THE UNIVERSAL SERIAL BUS WHEN THE TEMPORARY BLOCK FLOW IS NOT DETECTED FOR A GUARD INTERVAL
306

*FIG. 3*

POWER MANAGEMENT TECHNIQUES FOR A UNIVERSAL SERIAL BUS

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Providing both processing and communications capabilities in a single device produces exceptional power management issues for smart phones, particularly as form factors for smart phones continue to decrease. As a result, battery life for a smart phone may be substantially shortened. This may force frequent recharging operations, thereby impairing the convenience of such devices. Consequently, improved power management techniques are desired.

BRIEF DESCRIPTION OF THE DRAWINGS

FIG. 3 illustrates one embodiment of a logic diagram.

DETAILED DESCRIPTION

Figure 1:
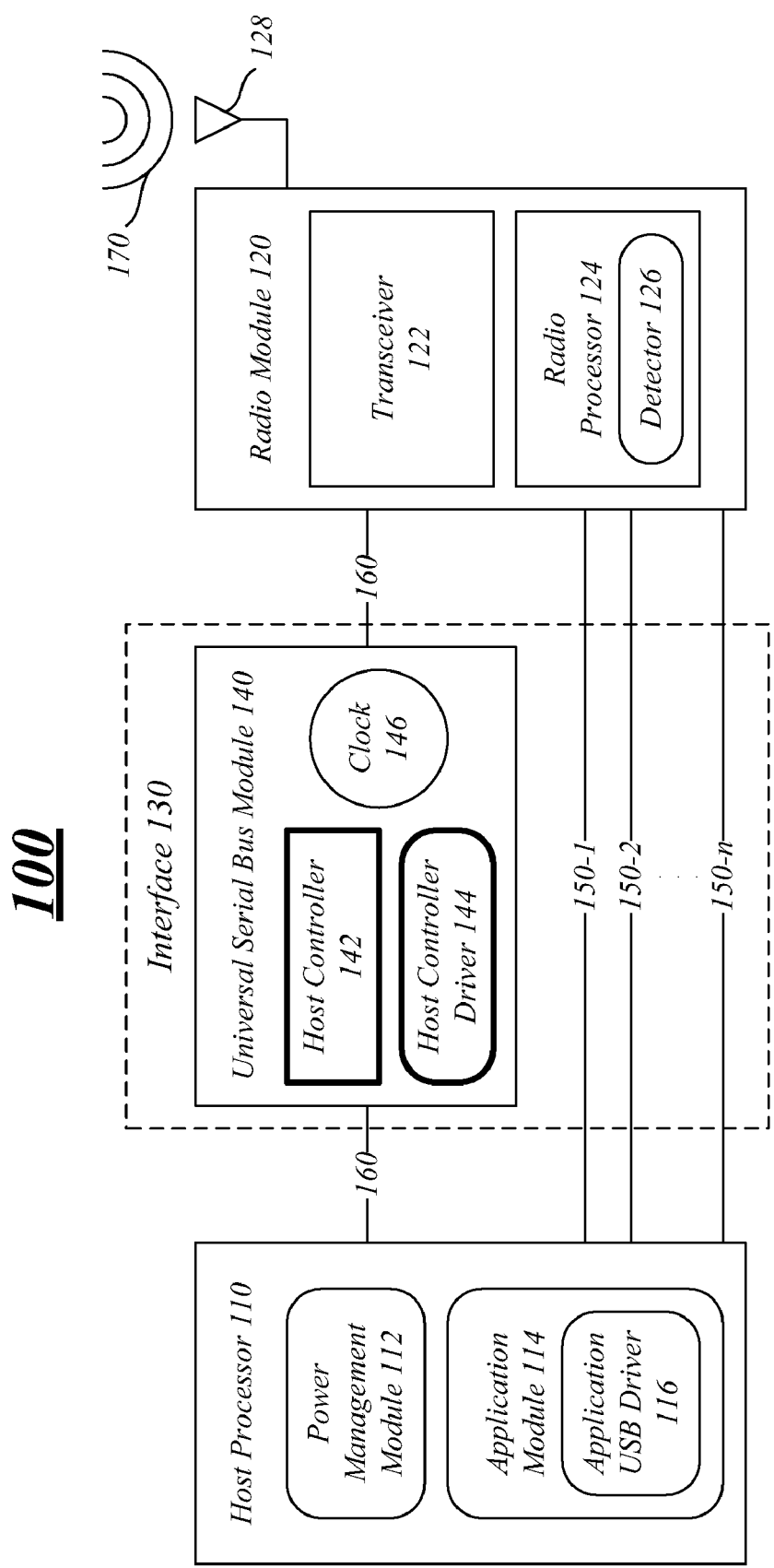
FIG. 1 illustrates one embodiment of an apparatus.

Various embodiments may be generally directed to power management techniques for a mobile computing device, such as a smart phone. Some embodiments may be particularly directed to power management techniques for an interface between processing components and communications components of a mobile computing device. An example of an interface may include a universal serial bus (USB) interface, although the embodiments are not limited to this example.

In one embodiment, for example, a mobile computing device may include a host processor and a radio module each coupled to an interface with a USB. The radio module may include a radio processor and a detector. The detector may be arranged to detect temporary block flow (TBF) from radio signals communicated over wireless shared media. The radio processor may be arranged to enable the USB when the detector detects the TBF. The radio processor may be further arranged to disable the USB when the detector does not detect the TBF for a guard interval. Other embodiments are described and claimed.

Enabling and disabling the USB based on TBF detection may provide several advantages. For example, the USB and accompanying USB infrastructure draw a significant amount of power from a power supply (e.g., a battery) for the mobile computing device. The power supply has limited amounts of power, and efficient use of the power supply provides various operational advantages. The USB infrastructure, however, typically draws power from the power supply regardless of whether there is any information ready to transmit over the USB. This is particularly true with respect to the radio module, since the radio module is routinely scanning any radio signals received over the wireless shared media. In particular, the radio module may scan for the presence or absence of TBF, which are Radio Link Control (RLC) and/or Media Access Control (MAC) layer signals communicated over a Global System for Mobile Communications (GSM) and General Packet Radio Service (GPRS) cellular radiotelephone system. Due to the latency involved in waking the USB to transmit GPRS data from the radio processor to the host processor, the USB typically remains in an active state or partially active state. This may unnecessarily draw power from the power supply, thereby reducing battery life.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of an apparatus that may communicate across different types of wireless links. In particular, FIG. 1 shows an apparatus 100 comprising various elements, including a host processor 110, a radio module 120, and an interface 130. These elements or portions of these elements may be implemented in hardware, software, firmware, or in any combination thereof. The embodiments are not limited to these depicted elements.

The apparatus 100 may be implemented as part of a mobile computing device. A mobile computing device may be configured to support or provide cellular voice communication, wireless data communication and computing capabilities. The mobile computing device may be implemented as a combination handheld computer and mobile telephone, sometimes referred to as a smart phone. Examples of smart phones include, for example, Palm® products such as Palm® Treo™ smart phones. Although some embodiments may be described with the mobile computing device implemented as a smart phone by way of example, it may be appreciated that the embodiments are not limited in this context. For example, the mobile computing device may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 4.

The host processor 110 may provide general or specific computing capabilities for the apparatus 100. For example, the host processor 110 may perform operations associated with higher layer protocols and applications. For instance, the host processor may provide various user applications, such as telephony, text messaging, e-mail, web browsing, word processing, video signal display, and so forth. In addition, the host processor 110 may provide one or more functional utilities that are available to various protocols, operations, and/or applications. Examples of such utilities include operating systems, device drivers, user interface functionality, and so forth.

FIG. 1 shows that the host processor 110 includes a power management module 112. The power management module 112 may control various power management operations for the apparatus 100. For example, the power management module 112 may be arranged to control the USB infrastructure of the apparatus 100. The power management module 112 may issue control directives to the USB infrastructure to control when the USB infrastructure consumes or draws power from a power supply, such as a battery. The power management module 112 may issue the control directives in response to signals received from the radio module 120.

FIG. 1 also shows that the host processor 110 includes an application module 114 with an application USB driver 116. The application module 114 may represent various user applications or system applications for the apparatus 100. The application USB driver 116 may operate as an interface between the application module 114 and the USB infrastructure of the apparatus 100. As with the power management module 112, the application USB driver 116 may issue control directives to the USB infrastructure to control when the USB infrastructure consumes or draws power from a power supply, such as a battery. Alternatively, the application USB driver 116 may issue its control directives to the power management module 112, which in turn passes the control directives to the USB infrastructure.

The radio module 120 may communicate with remote devices across different types of wireless links. For example, the radio module 120 may communicate across wireless links provided by one or more cellular radiotelephone systems. Examples of cellular radiotelephone systems may include Code Division Multiple Access (CDMA) systems, GSM systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. The radio module 120 (or a second radio module) may also communicate across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. The embodiments, however, are not limited to these examples. For instance, the radio module 120 may additionally or alternatively communicate across non-cellular communications links.

FIG. 1 shows that the radio module 120 includes a transceiver 122. The transceiver 122 may transmit and receive wireless signals through an antenna 128. As described above, these signals may be associated with various wireless voice and data networks.

FIG. 1 also shows that the radio module 120 includes a radio processor 124. The radio processor may provide general or specific computing capabilities for the radio module 120. For example, the radio processor 124 controls the operation of the transceiver 122, such as scheduling transmission and reception activity for the transceiver 122. Further, the radio processor 124 may perform operations on payload information that it exchanges with the transceiver 122. Examples of such operations include error correction encoding and decoding, packet encapsulation, various media access control protocol functions, and so forth. The radio processor 124 may also be referred to sometimes as a baseband processor or communications controller.

The radio processor 124 may include a detector 126. The detector 126 may be arranged to monitor radio signals 170 communicated over a wireless shared media, such as portions of the radio-frequency (RF) spectrum. More particularly, the detector 126 may be arranged to monitor the radio signals 170 for specific information, such as TBF for a GPRS system. The presence or absence of TBF in the radio signals 170 may be used to control the USB infrastructure of the apparatus 110.

The host processor 110 and the radio module 120 may exchange information over the interface 130. For instance, the host processor 110 may send information to the radio module 120 for wireless transmission. Conversely, the radio module 120 may send information to the host processor 110 that was received in wireless transmissions. In addition, the host processor 110 may exchange information with the radio module 120 regarding their configuration and operation. Examples of such information may include whether the detector 126 detects the presence or absence of TBF from the radio signals 170.

The interface 130 provides various signal control elements and signal lines for couplings among elements, such as the host processor 110 and the radio module 120. Thus, the interface 130 may include, for example, one or more bus interfaces. Exemplary interfaces include Universal Serial Bus (USB) interfaces, micro-USB interfaces, as well as various computer system bus interfaces. Additionally or alternatively, the interface 130 may include one or more point-to-point connections (e.g., parallel interfaces, serial interfaces, etc.) between various element pairings. For example, the interface 130 may include a universal asynchronous receiver/transmitter (UART) that translates data between parallel and serial interfaces, a general purpose input/output (GPIO) that provides a set of IO ports in the form of dedicated general-purpose pins which can be configured for either inputs or outputs, dedicated data lines, dedicated control lines, a data network, and so forth.

FIG. 1 shows the interface 130 with a USB module 140. The USB module 140 includes various USB infrastructure elements designed to provide USB operations for communicating information across the interface 130 between the host processor 110 and the radio module 120. The USB module may include a host controller 142, a host controller driver (HCD) 144 and a clock 146. The host controller 142 is a hardware device that interfaces to the HCD 144 and the USB 160. The host controller 142 processes data lists constructed by the HCD 144 for data transmission over the USB 160. The host controller 142 typically contains the root hub as well. The HCD 144 is a software driver that interfaces to the application USB driver 116 and the host controller 142. The interfaces to the HCD 144 may be defined, for example, by the Open Host Controller Interface (OpenHCI) Specification for USB, 1999, among others. The clock 146 may provide electrical clock signals for the USB 160. The clock 146 may comprise any suitable clocking element for digital integrated circuits, including an oscillator, a crystal oscillator, and so forth.

FIG. 1 also shows the interface 130 having various signal lines 150-1-$n$ to communicate information between the host processor 110 and the radio module 120. The information may be communicated as messages implemented as signals allocated to various signal lines 150-1-$n$. In such allocations, each message is a signal. Some embodiments, however, may alternatively employ data messages. Such data messages may be sent across various connections. Exemplary connections include parallel interfaces, serial interfaces, and bus interfaces. For example, data messages may be sent via the USB module 140, a UART, and so forth. The interface 130 in general, and examples for the signal lines 150-1-$n$ in particular, may be described in more detail with reference to FIG. 2.

Figure 2:
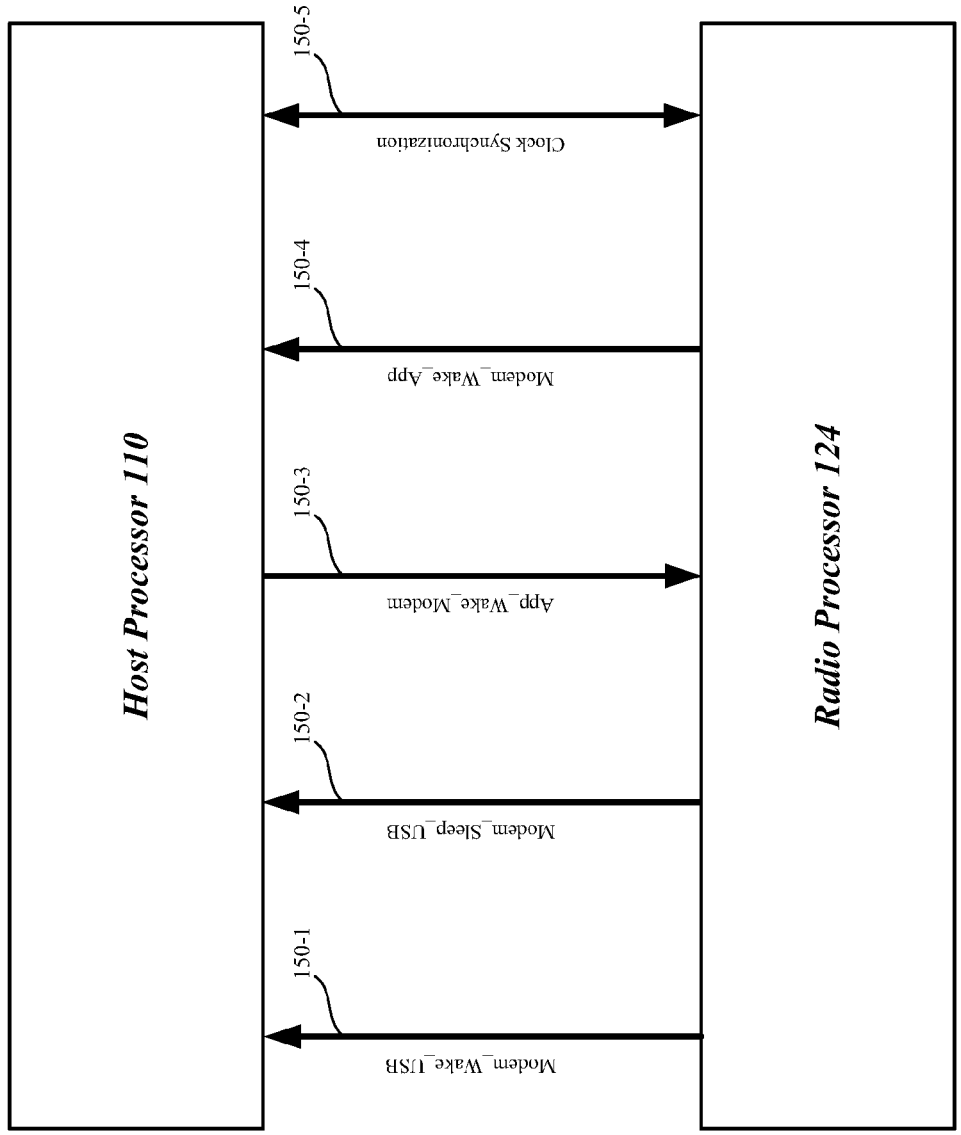
FIG. 2 illustrates one embodiment of an implementation.

FIG. 2 illustrates one embodiment an implementation 200. As described above with reference to FIG. 1, the host processor 110 and the radio processor 124 may communicate over the USB 160 and the signal lines 150-1-$n$ of the interface 130. The implementation 200 shown in FIG. 2 is a diagram of an exemplary implementation of the type of signals that may be communicated over the interface 130. The implementation 200 may comprise various elements. The embodiments, however, are not limited to these elements. For instance, certain embodiments may include other combinations of elements, as well as other couplings and signals between elements.

In particular, FIG. 2 shows the implementation 200 having the host processor 110, the radio processor 124, and signal lines 150-1-5. The signal lines 150-1-5 may communicate various exemplary messages, signals or control directives between the processors 110, 124 to exchange information. The processors 110, 124 may employ various techniques to exchange information over the signal lines 150-1-5. For example, the processors 110, 124 may activate and/or detect activated signal lines, or deactivate and/or detect deactivated signal lines. Such signal lines may be dedicated to particular signals. Alternatively, the processors 110, 124 may generate data messages to be transmitted across various connections. Exemplary connections may include a parallel interface, a serial interface, a bus interface, and/or a data network.

The signal line 150-1 may communicate information between the host processor 110 and the radio processor 124 to assist in enabling the USB module 140 for operation. For example, the radio processor 124 may send a modem wake USB signal (e.g., modem_wake_USB) to the host processor 110 to enable the USB module 140.

The signal line 150-2 may communicate information between the host processor 110 and the radio processor 124 to assist in disabling the USB module 140 from operation. For example, the radio processor 124 may send a modem sleep USB signal (e.g., modem_sleep_USB) to the host processor 110 to disable the USB module 140.

The signal line 150-3 may communicate information between the host processor 110 and the radio processor 124 to assist in waking up the radio processor 124 when it enters a lower power state to allow the radio processor 124 to receive information from the host processor 110 over the USB 160. For example, the host processor 110 may send an application wake modem signal (e.g., app_wake_modem) to the radio processor 124 to prepare the radio processor 124 to receive information from the host processor 110.

The signal line 150-4 may communicate information between the host processor 110 and the radio processor 124 to assist in waking up the host processor 110 when it enters a lower power state to allow the host processor 110 to receive information from the radio processor 124 over the USB 160. For example, the radio processor 124 may send a modem wake application signal (e.g., modem_wake_app) to the host processor 110 to prepare the host processor 110 to receive information from the radio processor 124.

Other signal lines may be used to convey other information between the processors 110, 124. For example, the signal line 150-5 may communicate timing and status information between the processors 110, 124. For instance, the signal line 150-5 may communicate timing and status information in the form of clock or synchronization pulses.

In general operation, the apparatus 100 may engage in communications across multiple wireless links. As described above, however, the USB module 140 may consume power regardless of whether the radio module 120 is actually communicating information over the wireless shared media. This power consumption may unnecessarily degrade battery life, thereby forcing a premature recharge of the battery, which may be inconvenient to the operator.

Embodiments, such as apparatus 100, may advantageously reduce or prevent such unnecessary power consumption through the monitoring of its wireless activities. For instance, the USB module 140 of the interface 130 may be effectively suspended, deactivated, or otherwise disabled for information exchange operations when certain information is not detected by the radio module 120. Conversely, the USB module 140 may be effectively resumed, activated, or otherwise enabled for information exchange operations when certain information is detected by the radio module 120. This coordination may be realized through the host processor 110 and the radio module 120 exchanging information over the interface 130. As described above, information exchange may be handled by the host processor 110 and the radio processor 124. The embodiments, however, are not limited to such implementations, and may use various other hardware or software elements as proxy elements to perform the desired information exchange.

The USB module 140 may be controlled by the power management module 112 and/or the application USB driver 116. In the former case, the power management module 112 may receive information from the radio module 120 or the application USB driver 116 to generate control directives for the USB module 140. In the latter case, the application USB driver 116 may receive information from the application module 114 to generate control directives for the USB module 140.

As previously described, the detector 126 may be arranged to detect TBF from the radio signals 170 communicated over wireless shared media. The TBF comprises signals communicated by a GPRS cellular radiotelephone system. In GPRS, the Radio RLC/MAC layer link between a mobile station and the cellular radiotelephone system infrastructure equipment (e.g., a base station system, serving GPRS support node, mobile switching center, and so forth) is called a TBF. For the radio module 120 to send or receive information over the wireless shared media, a TBF must be made available to the radio module 120. If a TBF is currently active then the radio module 120 may use the TBF thereby reducing delay. If no TBF is established then the radio module 120 and the network exchange signaling messages in an attempt to establish a TBF. The time needed to successfully achieve an active TBF depends on the availability of radio resources and is different for uplink and downlink connections. Once established, the TBF will generally remain active for as long as data is made available to the logical link control (LLC) layer.

The detector 126 may monitor or scan the radio signals 170 for the presence or absence of a TBF. The detector 126 may send a TBF present directive when a TBF is detected to enable the USB 160 between the host processor 110 and the radio processor 124. The detector 126 may send a TBF absent directive when a TBF is not detected for a guard interval to disable the USB 160.

The detector 126 uses a guard interval as a predetermined time period to monitor or scan the radio signals 170 to ensure the absence of a TBF from the radio signals 170. An active TBF may be used to asynchronously communicate Internet Protocol (IP) packets or datagrams of varying sizes. Without a guard interval, the detector 126 may issue a TBF absent directive in error since it may monitor the wireless shared media during a time period between packet arrivals, also referred to as interarrival time periods.

In some cases, a guard interval may be statically programmed for the detector 126. For this implementation, the guard interval typically remains static and does not change based on real-time factors. The predetermined time period may be selected based on such predicted factors or pre-measured statistics, such as predicted packet size, packet interarrival times, channel characteristics (e.g., signal-to-noise ratio), use characteristics, channel data rates, and so forth. In such cases, it may be desirable to set the guard interval to a time period that is longer than the longest predicted interarrival time typically realized by GPRS systems.

In other cases, a guard interval may be dynamically programmed for the detector 126. For this implementation, the guard interval typically remains dynamic and does change based on real-time factors. The detector 126 may monitor the wireless communications media to gather real-time network statistics, such as for packet size, packet interarrival times, channel characteristics (e.g., signal-to-noise ratio), use characteristics, channel data rates, and so forth. The detector 126 may then modify, change or update the guard interval to account for the measured statistics. For example, the detector 126 may determine an average packet interarrival time, and continuously or periodically update the guard interval to be longer than the average packet interarrival time. In another example, the detector 126 may determine an average packet size, and continuously or periodically update the guard interval based on the average packet size. This implementation may be advantageous in that it more precisely detects the absence of a TBF, and therefore reduces the probability of detection errors and inappropriate disablement of the USB module 140.

The radio processor 124 may be arranged to enable the USB 160 when the detector 126 detects the TBF. For example, the radio processor 124 may receive a TBF present directive from the detector 126 when the TBF is detected. The radio processor 124 may send a modem wake USB signal (e.g., modem_wake_USB) when the detector 126 detects the TBF.

The radio processor 124 may be arranged to disable the USB 160 when the detector 126 does not detect the TBF for a guard interval. For example, the radio processor 124 may receive a TBF absent directive from the detector 126 when a TBF is not detected for the guard interval. The radio processor 124 may send a modem sleep USB signal (e.g., modem_sleep_USB) when the detector 126 does not detect a TBF for the guard interval.

The power management module 112 of the host processor 110 may issue various control directives based on the signals received from the radio processor 124. For example, the power management module 112 may be operative to receive the modem_sleep_USB signal made active (e.g., logic high) when the detector 126 does not detect TBF for the guard interval. The power management module 112 may send a disable control directive to disable the USB 160 in response to the activated modem_sleep_USB signal. In another example, the power management module 112 may be operative to receive the modem_wake_USB signal made active (e.g., logic high) when the detector 126 detects the TBF. The power management module 112 may send an enable control directive to enable the USB 160 in response to the modem_wake_USB signal.

Additionally or alternatively, the application USB driver 116 may issue various control directives based on signals received from the application module 114. For example, the application module 114 may be executing and need to send application information over the USB 160. The application module 114 may send a data ready signal to the application USB driver 116. The application USB driver 116 may receive the data ready signal, and send an enable control directive to the HCD 144 in order to enable the USB 160 to allow the application module 114 to send the application information over the USB 160. Alternatively, the application USB driver 116 may send the enable control directive to the power management module 112, which in turn sends the enable control directive to the HCD 144 in order to enable the USB 160.

The USB module 140 may be selectively disabled based on the control directives issued by the power management module 112. For example, the host controller 142 may be operative to receive the disable control directive to disable the USB 160. The host controller 142 may have various operational states visible to the HCD 144 via one or more operational registers. A particular set of operational states may vary according to a specific implementation. In one embodiment, the USB module 140 may implement the OpenHCI Specification. According to the OpenHCI Specification, the host controller 142 may have four operational states, including a USB Operational state, a USB Reset state, a USB Suspend state, and a USB Resume state. The USB Suspend state disables list processing operations for the host controller 142 and the HCD 144. Consequently, the host controller 142 and/or the HCD 144 may receive the disable control directive to disable the USB 160, and place the host controller 142 and/or the HCD 144 in the USB Suspend state.

Additionally or alternatively to switching the host controller 142 and/or the HCD 144 in the USB Suspend state, the host controller 142 may disable the clock 146. The clock 146 may be used to generate and provide clock signals to the USB 160. In some cases, placing portions of the USB module 140 in a USB Suspend state may not necessarily affect the clock 146. Consequently, the host controller 142 may be arranged to disable the clock 146 in response to the disable control directive in order to prevent the clock 146 from providing clock signals to the USB 160. Accordingly, the USB module 140 may draw less power from the battery.

Conversely, the USB module 140 may be selectively enabled based on the control directives issued by the power management module 112. For example, the host controller 142 may be operative to receive the enable control directive to enable the USB 160. As previously described, the host controller 142 may have various operational states visible to the HCD 144 via one or more operational registers. One operational state is the USB Resume state. The USB Resume state enables list processing operations for the host controller 142 and the HCD 144. The USB Resume state forces resume signaling on the USB 160. Consequently, the host controller 142 and/or the HCD 144 may receive the enable control directive to enable the USB 160, and place the host controller 142 and/or the HCD 144 in the USB Resume state. Furthermore, the host controller 142 may be arranged to enable the clock 146 in response to the enable control directive in order to allow the clock 146 to provide clock signals to the USB 160.

Once the USB module 140 has been disabled, the radio processor 124 may also enter a lower power state to further conserve energy provided by the power supply. In this case, the radio processor 124 may need to be placed in a higher power state when the USB module 140 is enabled in order to receive information from the host processor 110 over the USB 160. To accomplish this, the host processor 110 may send an application wake modem signal (e.g., app_wake_modem) to wake the radio processor 124 when the application module 114 has information to send over the USB 160.

In some cases, the power management module 112 may disable the USB module 140, and the host processor 110 may also enter a lower power state to further conserve energy provided by the power supply. In this case, the host processor 110 may need to be placed in a higher power state when the USB module is enabled in order to receive information from the radio processor 124 over the USB 160. To accomplish this, the radio processor 124 may send a modem wake application signal (e.g., modem_wake_app) to wake the host processor 110 when the radio module 120 has information to send over the USB 160.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

FIG. 3 illustrates one embodiment of a logic flow. In particular, FIG. 3 illustrates a logic flow 300, which may be representative of the operations executed by one or more embodiments described herein. As shown in the FIG. 3, the logic flow 300 may detect a TBF from radio signals communicated over wireless shared media at block 302. The logic flow 300 may enable a USB between a host processor and a radio processor when the TBF is detected at block 304. The logic flow 300 may disable the USB when the TBF is not detected for a guard interval at block 306. The embodiments are not limited in this context.

In one embodiment, the logic flow 300 may detect a TBF from radio signals communicated over wireless shared media at block 302. For example, the detector 126 may monitor the wireless shared media for the radio signals 170 via the transceiver 122 and the antenna 128 in order to detect the presence or absence of a TBF. The detector 126 may detect the absence of a TBF using a static or dynamic guard interval.

In one embodiment, the logic flow 300 may enable a USB between a host processor and a radio processor when the TBF is detected at block 304. For example, the detector 126 may send a TBF present directive when a TBF is detected to enable the USB 160 between the host processor 110 and the radio processor 124. The radio processor 124 may receive the TBF present directive, and assert the modem_wake_USB signal for the signal path 150-1. The power management module 112 may detect the modem_wake_USB signal, and send an enable control directive to the HCD 144 using one or more HCI application program interfaces. The HCD 144 may communicate the enable control directive to the host controller 142 to place the host controller 142 in an USB Resume state to resume list processing operations. The host controller 142 may activate the clock 146 to begin sending clocking signals over the USB 160.

In one embodiment, the logic flow 300 may disable the USB when the TBF is not detected for a guard interval at block 306. For example, the detector 126 may send a TBF absent directive when a TBF is not detected for a guard interval to disable the USB 160. The radio processor 124 may receive the TBF absent directive, and assert the modem_ sleep_USB signal for the signal path 150-2. The power management module 112 may detect the modem_sleep_USB signal, and send a disable control directive to the HCD 144 using one or more HCI application program interfaces. The HCD 144 may communicate the disable control directive to the host controller 142 to place the host controller 142 in an USB Suspend state to suspend list processing operations. The host controller 142 may deactivate the clock 146 to prevent clocking signals from being sent over the USB 160.

In various embodiments, the elements of FIG. 1 may be implemented in hardware, software, firmware, or in any combination thereof. For instance, features of the power management module 112, the application module 114, the application USB driver 116, the HCD 144, the detector 126, among others, may be implemented with instructions or logic (e.g., software) that is provided on a storage medium or computer-readable medium for execution by one or more processors. For such implementations, these software elements may be executed by the host processor 110 and/or the radio processor 124. Alternatively, these software elements may be executed by dedicated processors or other processors accessible to the apparatus 100.

Figure 4:
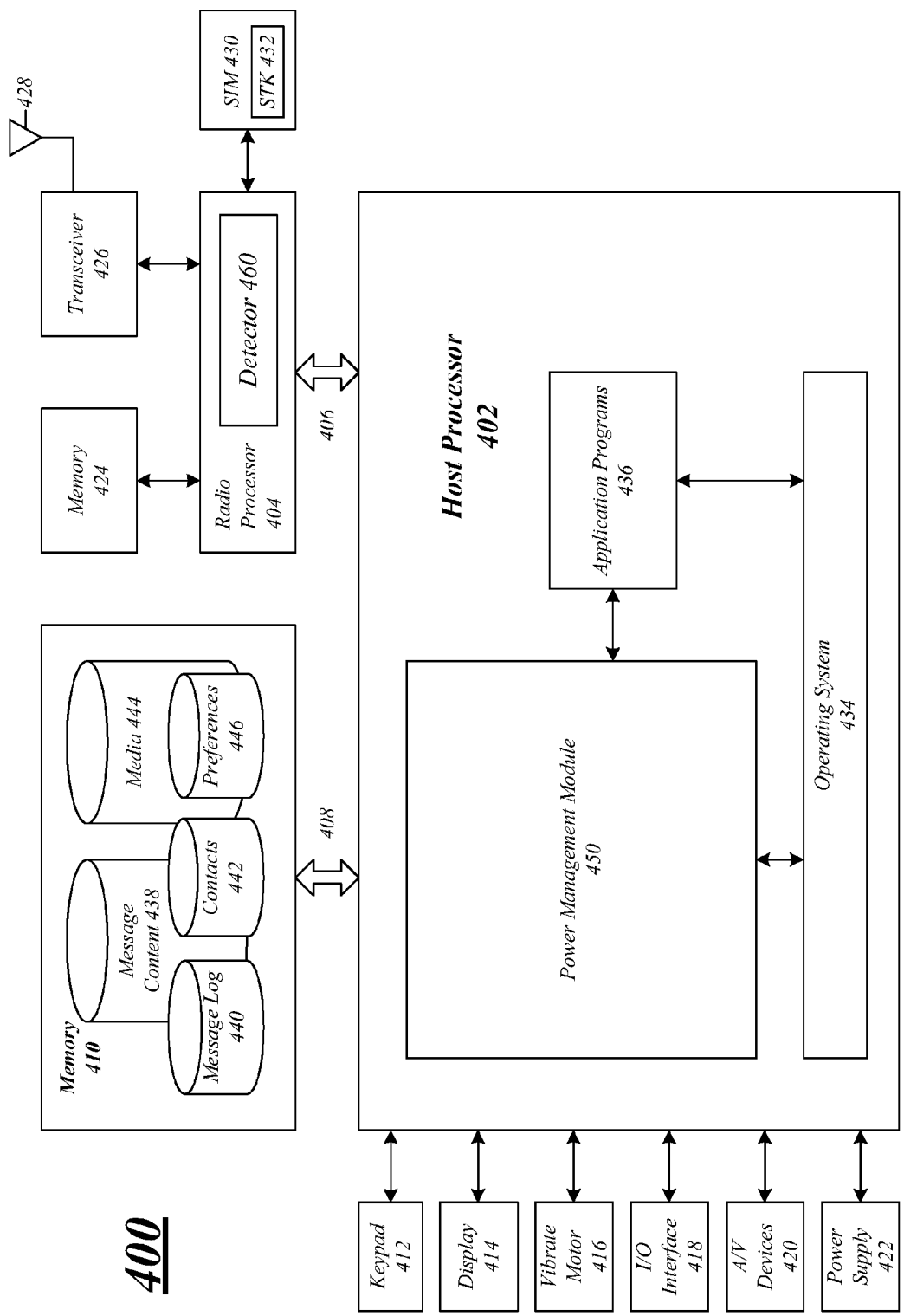
FIG. 4 illustrates one embodiment of a mobile computing device.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The mobile computing device 400 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile computing device 400 may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

The host processor 402 (e.g., similar to the host processor 110) may be responsible for executing various software programs such as system programs and applications programs to provide computing and processing operations for the mobile computing device 400. The radio processor 404 (e.g., similar to the radio processor 124) may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alphanumeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers, an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth. The radio processor 404 may include a detector 460. The detector 460 may the same or similar to the detector 126 described with reference to FIG. 1.

The mobile computing device 400 may comprise a memory 424 coupled to the radio processor 404. The memory 424 may be implemented using any of the computer-readable media described with reference to the memory 410. The memory 424 may be typically implemented as flash memory and secure digital (SD) RAM. Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. The OS 434 and the application programs 436 may be the same or similar to the application module 114 described with reference to FIG. 1. System programs generally may assist in the running of the mobile computing device 400 and may be directly responsible for controlling, integrating, and managing the individual hardware components of the computer system. The OS 434 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Runtime Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include a power management module 450. The power management module 450 may the same or similar to the power management module 112 described with reference to FIG. 1.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
an interface having a universal serial bus;
a host processor to couple to the interface; and
a radio module to couple to the interface, the radio module having a radio processor and a detector, the detector operative to detect a temporary block flow from radio signals communicated over wireless shared media, the temporary block flow comprising a radio layer link between the mobile computing device and cellular radiotelephone infrastructure equipment, the detector to send a temporary block flow present directive to the radio processor in order to enable the universal serial bus when the detector detects the temporary block flow, and the detector to send a temporary block flow absent directive to the radio processor in order to disable the universal serial bus when the detector does not detect the temporary block flow for a guard interval.

2. The mobile computing device of claim 1, the radio processor to send a modem sleep universal serial bus signal when the detector does not detect temporary block flow for the guard interval.

3. The mobile computing device of claim 1, the host processor having a power management module operative to receive a modem sleep universal serial bus signal when the detector does not detect temporary block flow for the guard interval, and send a disable control directive to disable the universal serial bus in response to the modem sleep universal serial bus signal.

4. The mobile computing device of claim 1, the radio processor to send a modem wake universal serial bus signal when the detector detects the temporary block flow.

5. The mobile computing device of claim 1, the host processor having a power management module operative to receive a modem wake universal serial bus signal when the detector detects the temporary block flow, and send an enable control directive to enable the universal serial bus in response to the modem wake universal serial bus signal.

6. The mobile computing device of claim 1, the host processor to send an application wake modem signal to wake the radio processor when an application module has information to send over the universal serial bus.

7. The mobile computing device of claim 1, the host processor having an application module operative to send application information over the universal serial bus, the application module having an application universal serial bus driver to send an enable control directive to enable the universal serial bus to allow the application module to send the application information over the universal serial bus.

8. The mobile computing device of claim 1, the interface having a universal serial bus module to control the universal serial bus, the universal serial bus module having a host controller and a clock, the host controller operative to receive a disable control directive to disable the universal serial bus and prevent the clock from providing clock signals to the universal serial bus in response to the disable control directive.

9. The mobile computing device of claim 1, the interface having a universal serial bus module to control the universal serial bus, the universal serial bus module having a host controller and a clock, the host controller operative to receive an enable control directive to enable the universal serial bus and allow the clock to provide clock signals to the universal serial bus in response to the enable control directive.

10. The mobile computing device of claim 1, the detector operative to detect temporary block flow from radio signals communicated over the wireless shared media, and determine the guard interval based on a packet size for the temporary block flow.

11. A method, comprising:
  detecting a temporary block flow from radio signals communicated over wireless shared media, the temporary block flow comprising a radio layer link between the mobile computing device and cellular radiotelephone infrastructure equipment;
  sending a temporary block flow present directive to the radio processor to enable a universal serial bus between a host processor and a radio processor when the temporary block flow is detected; and
  sending a temporary block flow absent directive to the radio processor to disable the universal serial bus when the temporary block flow is not detected for a guard interval.

12. The method of claim 11, comprising sending a modem sleep universal serial bus signal when the temporary block flow is not detected for the guard interval.

13. The method of claim 11, comprising:
  receiving a modem sleep universal serial bus signal when the temporary block flow is not detected for the guard interval; and
  sending a disable control directive to disable the universal serial bus in response to the modem sleep universal serial bus signal.

14. The method of claim 11, comprising sending a modem wake universal serial bus signal when the temporary block flow is detected.

15. The method of claim 11, comprising:
  receiving a modem wake universal serial bus signal when the temporary block flow is detected; and
  sending an enable control directive to enable the universal serial bus in response to the modem wake universal serial bus signal.

16. The method of claim 11, comprising sending an application wake modem signal to wake the radio processor when an application module has information to send over the universal serial bus.

17. The method of claim 11, comprising sending an enable control directive to enable the universal serial bus to allow an application module to send application information over the universal serial bus.

18. The method of claim 11, comprising:
  receiving a disable control directive to disable the universal serial bus; and
  preventing a clock from providing clock signals to the universal serial bus in response to the disable control directive.

19. The method of claim 11, comprising
  receiving an enable control directive to enable the universal serial bus; and
  allowing a clock to provide clock signals to the universal serial bus in response to the enable control directive.

20. The method of claim 11, comprising:
  detecting a temporary block flow from radio signals communicated over the wireless shared media; and
  determining the guard interval based on a packet size for the temporary block flow.

21. An article comprising a non-transitory computer-readable storage medium storing instructions that, when executed by a processor, enable a system to:
  monitor radio signals communicated over wireless shared media for a temporary block flow, the temporary block flow comprising a radio layer link between a mobile computing device and cellular radiotelephone infrastructure equipment;
  send a temporary block flow present directive when the temporary block flow is detected to enable a universal serial bus between a host processor and a radio processor; and
  send a temporary block flow absent directive when the temporary block flow is not detected for a guard interval to disable the universal serial bus.

22. The article of claim 21, further comprising instructions to:
  receive a modem sleep universal serial bus signal when the temporary block flow is not detected for the guard interval; and
  send a disable control directive to disable the universal serial bus in response to the modem sleep universal serial bus signal.

23. The article of claim 21, further comprising instructions to:
  receive a modem wake universal serial bus signal when the temporary block flow is detected; and
  send an enable control directive to enable the universal serial bus in response to the modem wake universal serial bus signal.

24. The article of claim 21, further comprising instructions to:
  receive a disable control directive to disable the universal serial bus; and
  prevent a clock from providing clock signals to the universal serial bus in response to the disable control directive.

25. The article of claim 21, further comprising instructions to:
  receive an enable control directive to enable the universal serial bus; and
  allow a clock to provide clock signals to the universal serial bus in response to the enable control directive.

* * * * *